US010935838B2

(12) United States Patent
Chen et al.

(10) Patent No.: US 10,935,838 B2
(45) Date of Patent: Mar. 2, 2021

(54) BACKLIGHT MODULE FOR DISPLAY APPARATUS, DISPLAY APPARATUS, AND METHOD OF DRIVING EDGE-LIT BACKLIGHT MODULE

(71) Applicants: BOE TECHNOLOGY GROUP CO., LTD., Beijing (CN); BEIJING BOE DISPLAY TECHNOLOGY CO., LTD., Beijing (CN)

(72) Inventors: Dongchuan Chen, Beijing (CN); Xibin Shao, Beijing (CN); Yanping Liao, Beijing (CN); Zhenyu Zhang, Beijing (CN); Fangyu Wang, Beijing (CN); Xueqiang Qian, Beijing (CN); Wenchao Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 415 days.

(21) Appl. No.: 15/761,357

(22) PCT Filed: Apr. 19, 2017

(86) PCT No.: PCT/CN2017/081046
§ 371 (c)(1),
(2) Date: Mar. 19, 2018

(87) PCT Pub. No.: WO2018/191878
PCT Pub. Date: Oct. 25, 2018

(65) Prior Publication Data
US 2020/0249507 A1 Aug. 6, 2020

(51) Int. Cl.
G02F 1/13357 (2006.01)
F21V 8/00 (2006.01)
(Continued)

(52) U.S. Cl.
CPC .......... G02F 1/1336 (2013.01); G02B 6/005 (2013.01); G02B 6/0068 (2013.01); G02F 1/137 (2013.01);
(Continued)

(58) Field of Classification Search
None
See application file for complete search history.

(56) References Cited

U.S. PATENT DOCUMENTS 8,368,637 B2 * 2/2013 Choi .................... G09G 3/3426
345/102
2009/0174638 A1 * 7/2009 Brown Elliott ...... G09G 3/2011
345/88

(Continued)

FOREIGN PATENT DOCUMENTS

CN 1851548 A 10/2006
CN 102770797 A 11/2012
(Continued)

OTHER PUBLICATIONS

International Search Report & Written Opinion dated Jan. 18, 2018, regarding PCT/CN2017/081046.

Primary Examiner — Elmito Breval
(74) Attorney, Agent, or Firm — Intellectual Valley Law, P.C.

(57) ABSTRACT

The present application discloses a backlight module for a display apparatus. The backlight module for a display apparatus includes a light guide plate; and a light transmittance control layer on the light guide plate configured to receive light from the light guide plate and modulate light intensity of the light from the light guide plate. The light transmittance control layer includes a light transmittance control material having a variable light transmissivity. Light trans-
(Continued)

mittance in a plurality of regions of the light transmittance control layer is individually controllable.

6 Claims, 11 Drawing Sheets

(51) Int. Cl.
   *G02F 1/133* (2006.01)
   *G02F 1/1334* (2006.01)
   *G02F 1/1343* (2006.01)
   *G02F 1/137* (2006.01)

(52) U.S. Cl.
   CPC ........ *G02F 1/1334* (2013.01); *G02F 1/13306* (2013.01); *G02F 1/13439* (2013.01); *G02F 1/134336* (2013.01); *G02F 2001/133601* (2013.01)

(56) References Cited

U.S. PATENT DOCUMENTS

| | | | |
|---|---|---|---|
| 2011/0193870 A1 | 8/2011 | Kerofsky | |
| 2014/0138022 A1* | 5/2014 | Bae | G09G 3/3648 156/267 |
| 2015/0185397 A1* | 7/2015 | Klement | G02B 6/005 345/690 |
| 2015/0302808 A1* | 10/2015 | Wang | G02F 1/136209 345/691 |
| 2016/0026048 A1* | 1/2016 | Liu | G02F 1/136227 257/72 |
| 2016/0161809 A1* | 6/2016 | Murata | G02F 1/133345 349/33 |
| 2016/0217752 A1* | 7/2016 | Shin | G09G 3/3607 |
| 2016/0238888 A1* | 8/2016 | Yao | G02F 1/133528 |
| 2016/0349587 A1* | 12/2016 | Park | G02F 1/136286 |

FOREIGN PATENT DOCUMENTS

| | | |
|---|---|---|
| CN | 204790254 U | 11/2015 |
| CN | 105261334 A | 1/2016 |
| CN | 106444150 A | 2/2017 |
| KR | 101275729 B1 | 6/2013 |

* cited by examiner

BACKLIGHT MODULE FOR DISPLAY APPARATUS, DISPLAY APPARATUS, AND METHOD OF DRIVING EDGE-LIT BACKLIGHT MODULE

CROSS-REFERENCE TO RELATED APPLICATION

This application is a national stage application under 35 U.S.C. § 371 of International Application No. PCT/CN2017/081046, filed Apr. 19, 2017, the contents of which are incorporated by reference in the entirety.

TECHNICAL FIELD

The present invention relates to display technology, more particularly, to a backlight module for a display apparatus, a display apparatus, and a method of driving an edge-lit backlight module.

BACKGROUND

Dynamic range refers to a ratio of light intensity of a brightest part of an image and the darkest part of the image. Typically, an image display on a conventional display apparatus may have a dynamic range of approximately 300:1. In certain contexts, the term "high dynamic range" refers to a dynamic range of approximately 800:1 or greater. Human eyes are capable of perceiving features in scenes having a very high dynamic range, e.g., as high as or greater than 1000:1. Thus, a display apparatus capable of rendering high dynamic range image display can provide a more realistic viewing experience and more faithful reproduction of the scene.

SUMMARY

In one aspect, the present invention provides a backlight module for a display apparatus comprising a light guide plate; and a light transmittance control layer on the light guide plate configured to receive light from the light guide plate and modulate light intensity of the light from the light guide plate, the light transmittance control layer comprising a light transmittance control material having a variable light transmissivity, light transmittance in a plurality of regions of the light transmittance control layer being individually controllable.

Optionally, light emission intensity of light emitted from the backlight module is individually controllable in each segment of an array of a plurality of segments in the backlight module; each of the plurality of regions corresponding to one or more of the plurality of segments.

Optionally, the light transmittance control material comprises a material having a light transmissivity that is electronically controllable by applying an electric potential to the light transmittance control material; and light transmittance in the plurality of regions of light transmittance control layer is individually controllable by individually applying an electric signal in each of the plurality of regions.

Optionally, the light transmittance control layer comprises liquid crystal molecules, light transmittance in the plurality of regions of light transmittance control layer being individually controllable by changing an orientation of the liquid crystal molecules in each of the plurality of regions.

Optionally, the backlight module further comprises a driving circuit configured to individually control light transmittance in each of the plurality of regions; a first electrode layer comprising a plurality of first transparent electrodes connected to the driving circuit, each of which being in one of the plurality of regions; and a second electrode layer on a side of the light transmittance control layer distal to the first electrode layer; wherein the driving circuit is configured to individually apply the electric signal to each of the plurality of regions through the first electrode layer and the second electrode layer.

Optionally, the second electrode layer comprises a plurality of second transparent electrodes connected to the driving circuit, each of which being in one of the plurality of regions.

Optionally, the second electrode layer is an integral electrode layer configured to be provided with a common voltage; and a projection of the second electrode layer on the light transmittance control layer covers those of the plurality of first transparent electrodes.

Optionally, each of the plurality of regions corresponds to a single one of the plurality of segments; and the light emission intensity of light emitted from the backlight module is individually controllable in each segment of the array of the plurality of segments by individually applying the electric signal to each of the plurality of regions through the driving circuit.

Optionally, the light transmittance control layer, the first electrode layer, and the second electrode layer constitute a twisted nematic liquid crystal display module.

Optionally, the backlight module further comprises a plurality of light sources along one or more lateral side of the light guide plate, at least one of the plurality of light sources being arranged substantially along a first direction, light emission intensity of the plurality of light sources being individually controllable.

Optionally, the backlight module further comprises a driving circuit configured to individually control light transmittance in each of the plurality of regions; a first electrode layer comprising a plurality of first transparent electrodes connected to the driving circuit, each of which being in one of the plurality of regions; and a second electrode layer on a side of the light transmittance control layer distal to the first electrode layer, wherein the driving circuit is configured to individually apply the electric signal to each of the plurality of regions through the first electrode layer and the second electrode layer; each of the plurality of first transparent electrodes has a rod shape; each of the plurality of regions corresponds to a plurality of segments in a row of the array of the plurality of segments along the first direction; and the light emission intensity of light emitted from the backlight module is individually controllable in each segment of the array of the plurality of segments by a combination of individually controlling light emission intensity of each of the plurality of light sources and individually applying the electric signal to each of the plurality of regions through the driving circuit.

Optionally, the light transmittance control layer comprises a polymer dispersed liquid crystal layer.

Optionally, the backlight module is an edge-lit backlight module; and a thickness of the black light module is no greater than 10 mm.

In another aspect, the present invention provides a method of driving an edge-lit backlight module comprising a light guide plate and a light transmittance control layer, comprising individually controlling light emission intensity of light emitted from the edge-lit backlight module in each segment of an array of a plurality of segments in the edge-lit backlight module by individually applying an electric signal to each region of a plurality of regions of the light transmittance control layer, each of the plurality of regions corresponding to one or more of the plurality of segments.

Optionally, each of the plurality of regions corresponds to a single one of the plurality of segments; and individually applying the electric signal to each region of the plurality of regions comprises time-sequentially applying a plurality of electric signals to the plurality of regions one row after another.

Optionally, each of the plurality of regions corresponds to a plurality of segments in a row of the array of the plurality of segments along a first direction; the edge-lit backlight module further comprises a plurality of light sources along one or more lateral sides of the light guide plate; the plurality of light sources being arranged substantially along the first direction; individually controlling light emission intensity of light emitted from the edge-lit backlight module in each segment further comprises individually controlling light emission intensity of each of the plurality of light sources; wherein individually applying the electric signal to each region of the plurality of regions comprises time-sequentially applying a plurality of electric signals respectively to the plurality of regions.

Optionally, the method further comprises receiving a plurality of data signals in each frame of image; and calculating a calculated light emission intensity of light for each segment based on the plurality of data signals in each frame of image; wherein individually controlling light emission intensity of light emitted from the edge-lit backlight module in each segment is based on the calculated light emission intensity of light for each segment.

In another aspect, the present invention provides a method of displaying high dynamic range images in a display apparatus having a backlight module including a light guide plate and a light transmittance control layer and having an array of a plurality of segments, light emission intensity of light emitted from each segment of the plurality of segments is individually controllable, the method comprising, in each frame of image, generating a plurality of data signals corresponding to a plurality of subpixels in the display apparatus; calculating a calculated light emission intensity of light for each segment of the plurality of segments based on the plurality of data signals in each frame of image; and individually controlling light emission intensity of light emitted from the backlight module in each segment of the plurality of segments in the backlight module by individually applying an electric signal to each region of a plurality of regions of the light transmittance control layer, each of the plurality of regions corresponding to one or more of the plurality of segments.

Optionally, each of the plurality of regions corresponds to a single one of the plurality of segments; and individually applying the electric signal to each region of the plurality of regions comprises time-sequentially applying a plurality of electric signals to the plurality of regions one row after another.

Optionally, each of the plurality of regions corresponds to a plurality of segments in a row of the array of the plurality of segments along a first direction; the edge-lit backlight module further comprises a plurality of light sources along one or more lateral sides of the light guide plate; at least one of the plurality of light sources being arranged substantially along the first direction; individually controlling light emission intensity of light emitted from the edge-lit backlight module in each segment further comprises individually controlling light emission intensity of each of the plurality of light sources; wherein individually applying the electric signal to each region of the plurality of regions comprises time-sequentially applying a plurality of electric signals respectively to the plurality of regions.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In order to display high dynamic range images in a conventional display apparatus, a direct-lit backlight module is required. The conventional direct-lit backlight module for high dynamic range image rendering typically is made of hundreds of light bulbs, light emission intensity of which may be controlled. The high dynamic range image rendering is achieved by local dimming of the light bulbs based on scenes of the displayed image. For example, the light emission intensity of the light bulbs corresponding to an area having brighter image display may be controlled to be relatively high whereas the light emission intensity of the light bulbs corresponding to an area having very dark image display may be controlled to be relatively low, thereby achieving a better contrast level.

Figure 1:
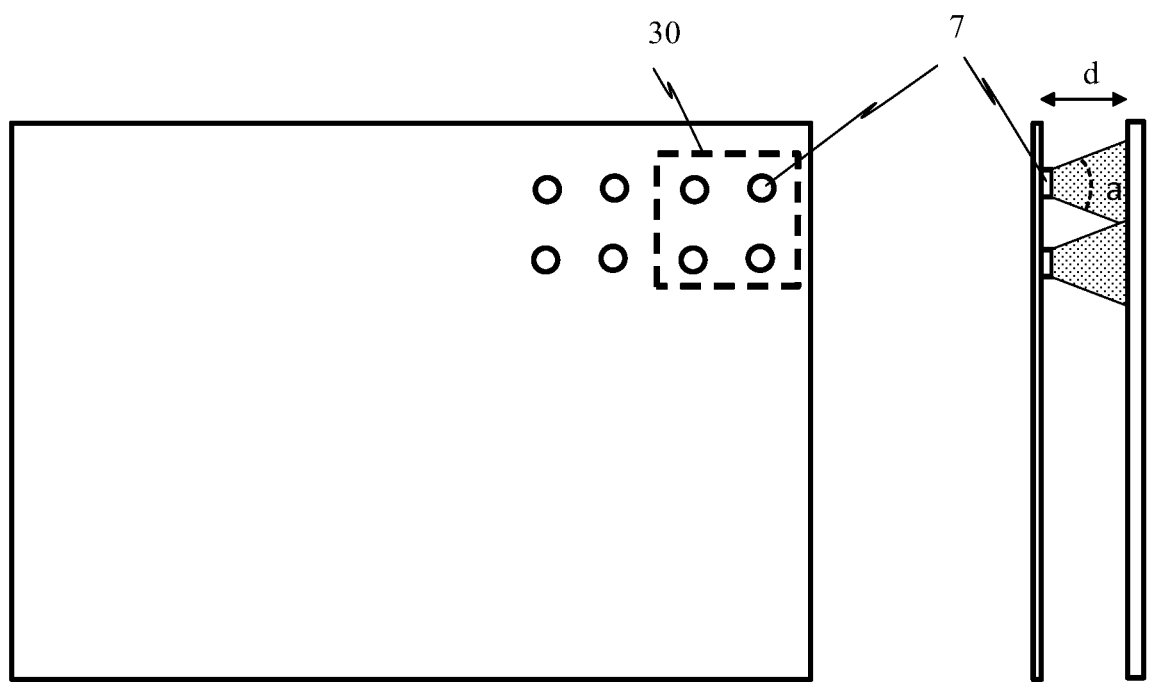
FIG. 1 is a diagram illustrating the structure of a conventional backlight module.

FIG. 1 is a diagram illustrating the structure of a conventional backlight module. Referring to FIG. 1, the conventional backlight module includes a reflector sheet 10, a diffuser 20, and a plurality of light emitting diode (LED) blocks 30 between the reflector sheet 10 and the diffuser 20.

Each of the plurality of LED blocks 30 includes a plurality of LED light bulb 7. The distance d between the reflector sheet 10 and the diffuser 20 is an optical distance within which light emitted from the plurality of LED light bulb 7 is allowed to be mixed. In order to achieve a uniform light emission intensity throughout the conventional direct-lit backlight module, an optical distance of more than 25 mm is typically required. As a result, the conventional backlight module is relatively thick, considering the required optical distance, and additional thickness provided by the reflector sheet 10 and the diffuser 20. An ultrathin display apparatus typically requires a thickness of the backlight module to be no greater than 10 mm. Thus, an ultrathin, high dynamic range rendering display apparatus is impossible in a conventional display apparatus.

Accordingly, the present disclosure provides, inter alia, a backlight module for a display apparatus, a display apparatus, and a method of driving an edge-lit backlight module that substantially obviate one or more of the problems due to limitations and disadvantages of the related art. In one aspect, the present disclosure provides a backlight module for a display apparatus. In some embodiments, the backlight module includes a light guide plate; and a light transmittance control layer including a light transmittance control material having a variable light transmissivity, light transmittance in a plurality of regions of the light transmittance control layer being individually controllable.

As used herein, the term "individually controllable" is to be understood that light transmittance of the light transmittance control layer in each region of the plurality of regions may be controlled independently of other regions of the light transmittance control layer, and light emission intensity of light emitted from the backlight module in each segment of the plurality of segments of the backlight module may be controlled independently of other segments of the backlight module. Optionally, the light transmittance in each region of the plurality of regions may be adjusted to any value in a range. Optionally, the light emission intensity of light emitted from the backlight module in each segment of the plurality of segments may be adjusted to any value in a range. For example, a voltage may be applied to each region of the plurality of regions independently of other regions. Optionally, the voltage applied to each region of the plurality of regions may be adjusted to any value in a range. Optionally, a voltage may be applied to each segment of the plurality of segments independently of other segments. Optionally, the voltage applied to each segment of the plurality of segments may be adjusted to any value in a range. In another example, the light transmittance control layer includes liquid crystal molecules, an orientation of the liquid crystal molecules in each region of the plurality of regions may be changed independently of other regions. Optionally, the orientation of the liquid crystal molecules in each segment of the plurality of segments may be changed independently of other segments.

Figure 2:
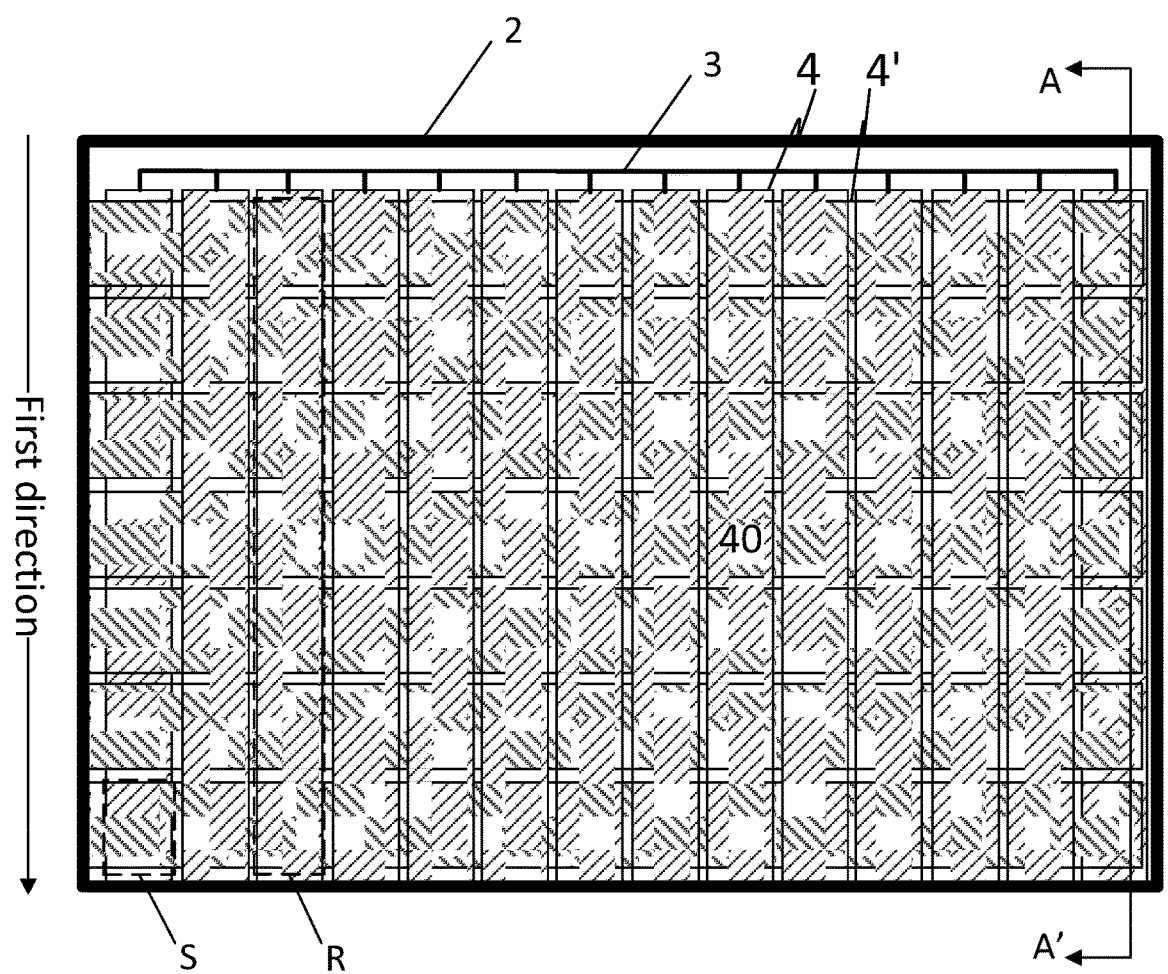
FIG. 2 is a diagram illustrating the structure of a backlight module in some embodiments according to the present disclosure.
Figure 3:
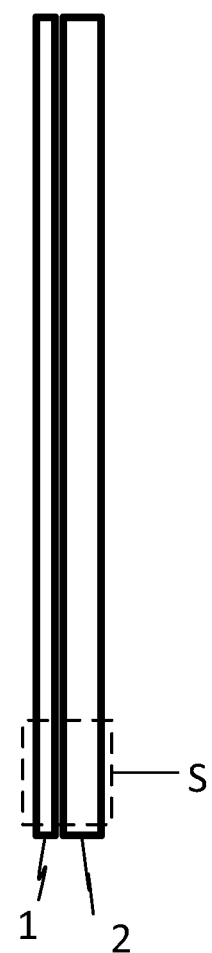
FIG. 3 is a cross-sectional view along the A-A' line in the backlight module of FIG. 2.

FIG. 2 is a diagram illustrating the structure of a backlight module in some embodiments according to the present disclosure. FIG. 3 is a cross-sectional view along the A-A' line in the backlight module of FIG. 2. Referring to FIGS. 2 and 3, the backlight module in some embodiments include a light guide plate 1, and a light transmittance control layer 2 on the light guide plate 1 configured to receive light from the light guide plate 1 and modulate light intensity of the light from the light guide plate 1. Optionally, a projection of the light transmittance control layer 2 on the light guide plate 1 substantially covers the light guide plate 1. Optionally, a projection of the light transmittance control layer 2 on the light guide plate 1 substantially overlaps with the light guide plate 1. The backlight module includes an array of a plurality of segments S. In the backlight module according to the present disclosure, light emission intensity of light emitted from the backlight module and provided to the display panel is individually controllable in each segment of the array of the plurality of segments S in the backlight module. By having the light transmittance control layer 2, individual control of the light emission intensity in each segment of the plurality of segments of the backlight module can be realized, which is not possible in conventional backlight module, particularly in conventional edge-lit backlight module. By individually controlling the light emission intensity in each segment of the plurality of segments, a real-time luminance adjustment in each individual segment of the backlight module can be achieved. Because of the real-time luminance adjustment in each individual segment of the backlight module, a display effect having a high dynamic range can be achieved in a display apparatus having the present backlight module.

In some embodiments, the light transmittance control layer 2 includes a plurality of regions R. Light transmittance in the plurality of regions R of the light transmittance control layer 2 is individually controllable. Each of the plurality of regions R corresponds to one or more of the plurality of segments S. Referring to FIG. 2, each of the plurality of regions R in some embodiments corresponds to a row of segments in the array of the plurality of segments S along a first direction (e.g., a column direction in FIG. 2). Optionally, each of the plurality of regions R corresponds to a single one of the plurality of segments S. Optionally, each of the plurality of regions R corresponds to a portion of a row (e.g., half a row) of segments in the array of the plurality of segments S. Various appropriate arrangements may be implemented in the present backlight module.

Various appropriate light transmittance control materials may be used in the present light transmittance control layer. Examples of appropriate light transmittance control materials include, but are not limited to, materials having a variable and controllable light transmissivity, e.g., materials having a light transmissivity that is controllable by applying an external signal thereto. The light transmissivity depends at least in part on a magnitude of the applied external signal. Non-limiting examples of such materials include liquid crystal materials and electrochromic materials.

In some embodiments, the light transmittance control material includes a material having a light transmissivity that is electronically controllable by applying an electric potential to the light transmittance control material. The light transmittance in the plurality of regions R of light transmittance control layer 2 is individually controllable by individually applying an electric signal in each of the plurality of regions R. Optionally, the light transmittance control layer 2 includes liquid crystal molecules, and the light transmittance in the plurality of regions R of light transmittance control layer 2 is individually controllable by individually applying an electric signal in each of the plurality of regions R, thereby changing an orientation of the liquid crystal molecules in each of the plurality of regions R. Optionally, the light transmittance control layer 2 includes electrochromic molecules, and the light transmittance in the plurality of regions R of light transmittance control layer 2 is individually controllable by individually applying an electric signal in each of the plurality of regions R, thereby changing a light blocking degree of the electrochromic molecules in each of the plurality of regions R.

Referring to FIGS. 2 and 3, the backlight module in some embodiments further includes a driving circuit 3 configured to individually control light transmittance in each of the plurality of regions R. Optionally, the driving circuit 3 is configured to individually applying an electric signal (e.g., a voltage) to each of the plurality of regions R thereby individually controlling the light transmittance in each of the plurality of regions R. Optionally, the backlight module includes a first electrode layer 4 having a plurality of first transparent electrodes 40 connected to the driving circuit 3, and a second electrode layer 4'; the first electrode layer 4 and the second electrode layer 4' configured to apply the electric signal to each of the plurality of regions R. Upon receiving the electric signal from the first electrode layer 4 and the second electrode layer 4', the light transmittance in each of the plurality of regions R undergoes a change. The first electrode layer 4 and the second electrode layer 4' may be disposed on two sides of the light transmittance control layer 2, e.g., the second electrode layer 4' is on a side of the light transmittance control layer 2 distal to the first electrode layer 4. The plurality of first transparent electrodes 40 may be respectively disposed in the plurality of regions R, each of the plurality of first transparent electrodes 40 being in one of the plurality of regions R.

Figure 4:
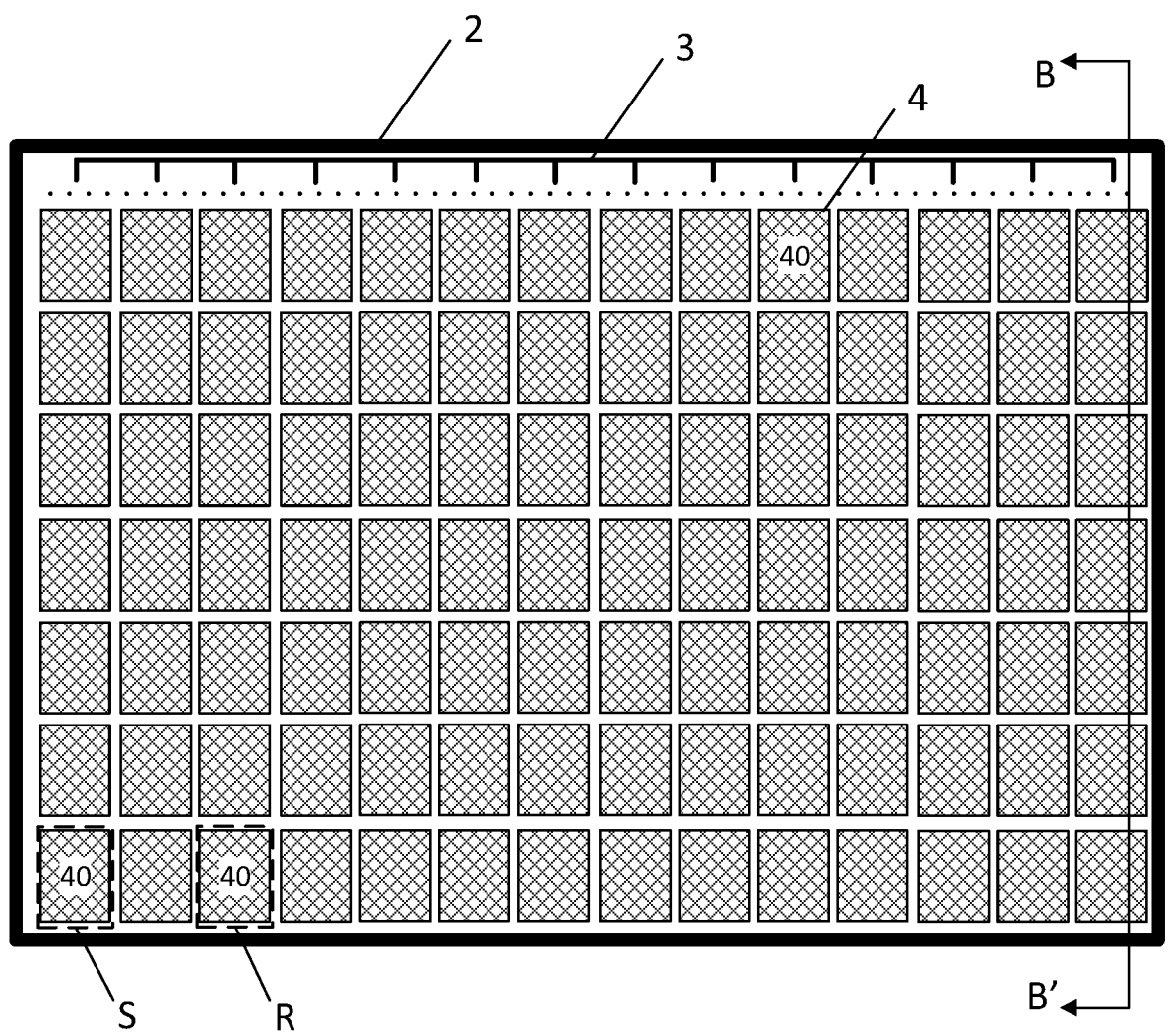
FIG. 4 is a diagram illustrating the structure of a backlight module in some embodiments according to the present disclosure.
Figure 5:
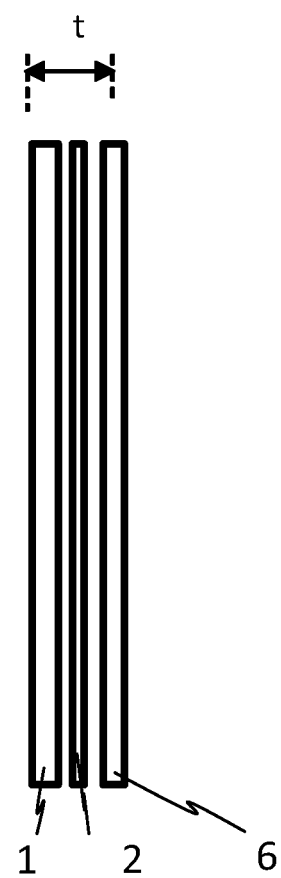
FIG. 5 is a cross-sectional view along the B-B' line in the backlight module of FIG. 4.

In some embodiments, each of the plurality of regions corresponds to a single one of the plurality of segments, and the light emission intensity of light emitted from the backlight module and provided to the display panel is individually controllable in each segment of the array of the plurality of segments by, e.g., individually applying the electric signal to each of the plurality of regions through the driving circuit. FIG. 4 is a diagram illustrating the structure of a backlight module in some embodiments according to the present disclosure. FIG. 5 is a cross-sectional view along the B-B' line in the backlight module of FIG. 4. Referring to FIGS. 4 and 5, the backlight module in some embodiments includes a first electrode layer 4 having an array of a plurality of first transparent electrodes 40 connected to a driving circuit 3. Each of the plurality of first transparent electrodes 40 defines one of the plurality of regions R and defines one of the plurality of segments S, i.e., each of the plurality of regions R corresponding to a single one of the plurality of segments S. Referring to FIG. 5, the backlight module in some embodiments includes a light guide plate 1, a light transmittance control layer 2 on the light guide plate 1, and an overcoat layer 6 on a side of the light transmittance control layer 2 distal to the light guide plate 1. The overcoat layer 6 is on a light emitting side of the backlight module. As shown in FIG. 5, a total thickness of the light guide plate 1, the light transmittance control layer 2, and the overcoat layer 6 is denoted as t. Optionally, the backlight module is an edge-lit backlight module, and the backlight module further includes a plurality of light sources disposed on one or more edges of the light guide plate 1. Thus, the total thickness of the edge-lit backlight module is substantially the same as t. In some embodiments, the present backlight module is one for rendering a display effect having a high dynamic range in a display apparatus. As compared to conventional backlight modules for high dynamic range display, the present backlight module can be made ultrathin. Optionally, a thickness of the present backlight module is no greater than 25 mm, e.g., no greater than 10 mm, or no greater than 5 mm. Optionally, a thickness of the present backlight module is no greater than 5 mm.

Figure 6:
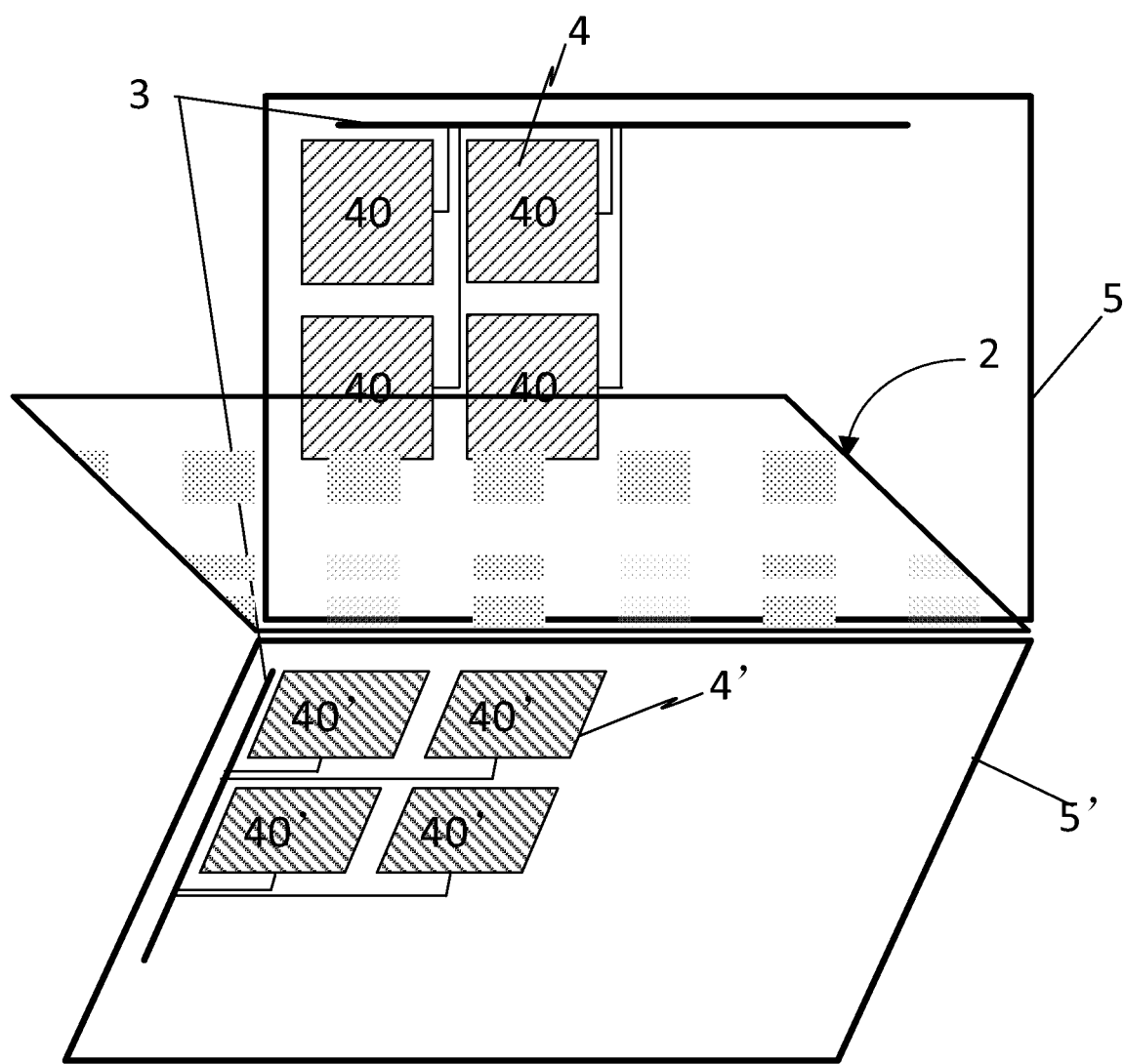
FIG. 6 is an exploded view of the structure of a backlight module in some embodiments according to the present disclosure.

FIG. 6 is an exploded view of the structure of a backlight module in some embodiments according to the present disclosure. Referring to FIG. 6, the backlight module in some embodiments includes a first base substrate 5, a first electrode layer 4 on the first base substrate 5, a light transmittance control layer 2 on a side of the first electrode layer 4 distal to the first base substrate 5, and a second electrode layer 4' on a side of the light transmittance control layer 2 distal to the first electrode layer 4. As shown in FIG. 6, the first electrode layer 4 includes a plurality of first transparent electrodes 40, and the second electrode layer 4' includes a plurality of second transparent electrodes 40', each of the plurality of second transparent electrodes 40' corresponding to one of the plurality of first transparent electrodes 40. The backlight module further includes a driving circuit 3 connected to the plurality of first transparent electrodes 40 and the plurality of second transparent electrodes 40'. The driving circuit 3 is configured to individually apply an electric signal (e.g., a voltage) to each pair of one of the first transparent electrodes 40 and one of the second transparent electrodes 40'. Each pair of one of the first transparent electrodes 40 and one of the second transparent electrodes 40' corresponds to (e.g., defines) one of the plurality of segments S (see, e.g., FIG. 4). By individually applying the electric signal to each pair of one of the first transparent electrodes 40 and one of the second transparent electrodes 40', light transmittance in each of the plurality of regions can be individually controlled.

In some embodiments, the voltage individually applied to each pair of one of the first transparent electrodes 40 and one of the second transparent electrodes 40' can be adjusted between a first voltage level and a second voltage level. Accordingly, the light transmittance in each of the plurality of regions can be individually controlled between a first light transmittance level corresponding to the first voltage level and a second light transmittance level corresponding to the second voltage level. Similarly, light emission intensity of light emitted from the backlight module and provided to the display panel can be adjusted between a first intensity level corresponding to the first light transmittance level and a second intensity level corresponding to the second light transmittance level. Because the light emission intensity of light emitted from each of the plurality of segments may be individually controlled, a display effect having a high dynamic range can be achieved in a display apparatus having the present backlight module.

Figure 7:
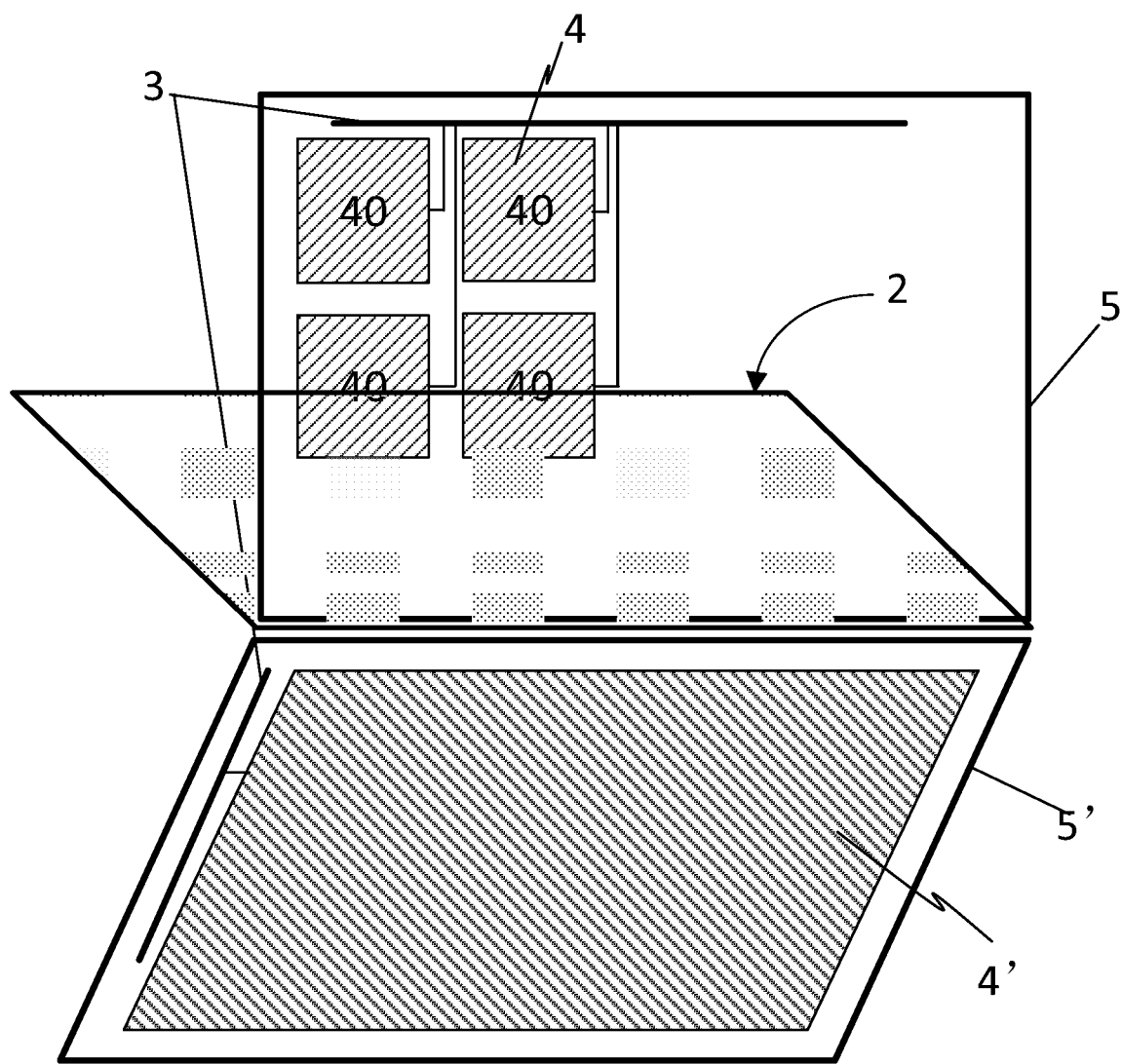
FIG. 7 is an exploded view of the structure of a backlight module in some embodiments according to the present disclosure.

FIG. 7 is an exploded view of the structure of a backlight module in some embodiments according to the present disclosure. Referring to FIG. 7, the backlight module in some embodiments includes a first base substrate 5, a first electrode layer 4 on the first base substrate 5, a light transmittance control layer 2 on a side of the first electrode layer 4 distal to the first base substrate 5, and a second electrode layer 4' on a side of the light transmittance control layer 2 distal to the first electrode layer 4. As shown in FIG. 7, the first electrode layer 4 includes a plurality of first transparent electrodes 40, and the second electrode layer 4' is an integral electrode layer configured to be provided with a common voltage. Optionally, a projection of the second electrode layer 4' on the light transmittance control layer 2 covers those of the plurality of first transparent electrodes 40. The backlight module further includes a driving circuit 3 connected to the plurality of first transparent electrodes 40 and the integral electrode layer of the second electrode layer 4'. The driving circuit 3 is configured to individually apply an electric signal (e.g., a voltage) to each of the plurality of first transparent electrodes 40. Each of the first transparent electrodes 40 corresponds to (e.g., defines) one of the plurality of segments S (see, e.g., FIG. 4). By individually applying the electric signal to each of the plurality of first transparent electrodes 40, light transmittance in each of the plurality of regions can be individually controlled.

In some embodiments, the voltage individually applied to each of the plurality of first transparent electrodes 40 can be adjusted between a first voltage level and a second voltage level. Accordingly, the light transmittance in each of the plurality of regions can be individually controlled between a first light transmittance level corresponding to the first voltage level and a second light transmittance level corresponding to the second voltage level. Similarly, light emission intensity of light emitted from the backlight module and provided to the display panel can be adjusted between a first intensity level corresponding to the first light transmittance level and a second intensity level corresponding to the second light transmittance level. Because the light emission intensity of light emitted from each of the plurality of segments may be individually controlled, a display effect having a high dynamic range can be achieved in a display apparatus having the present backlight module.

Figure 8:
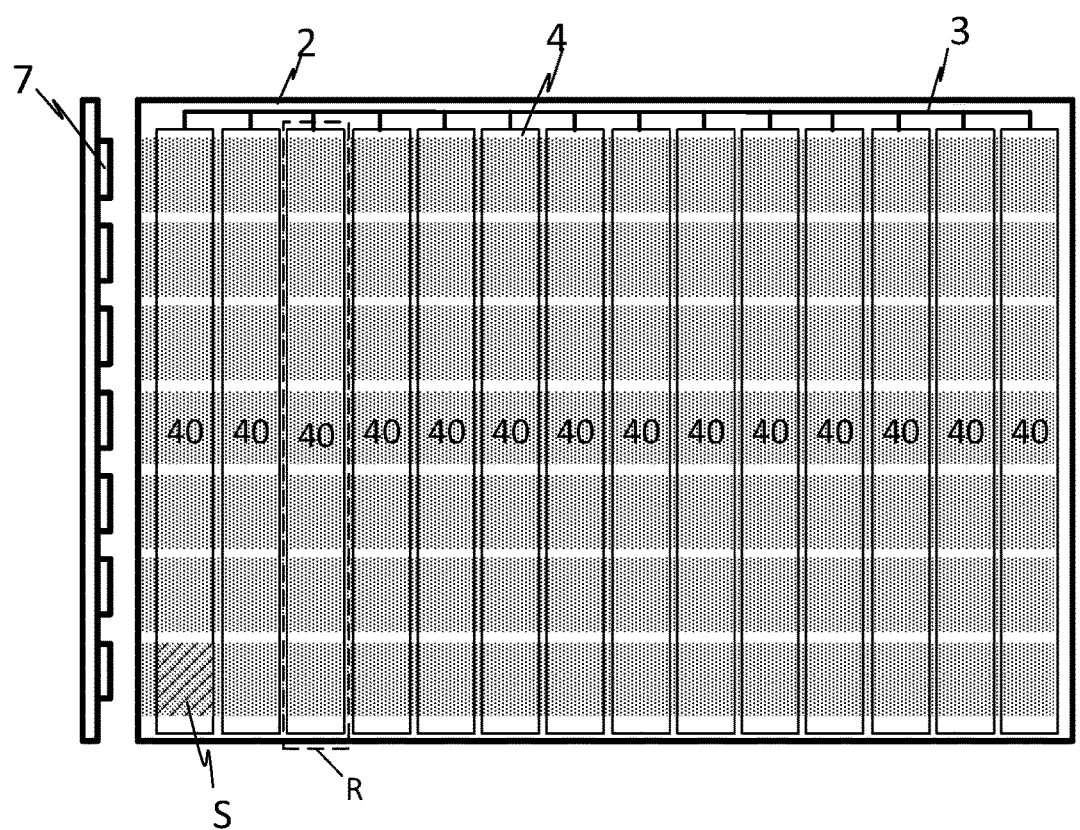
FIG. 8 is a diagram illustrating the structure of a backlight module in some embodiments according to the present disclosure.

In some embodiments, each of the plurality of regions corresponds to a plurality of segments in the array of the plurality of segments. Optionally, each of the plurality of regions corresponds to a plurality of segments in a row of the array of the plurality of segments along a first direction. In one example, each of the plurality of regions corresponds to all of segments in a row of the array of the plurality of segments. In another example, each of the plurality of regions corresponds to some but not all segments in a row of the array of the plurality of segments, e.g., half a row. Optionally, the backlight module further includes a plurality of light sources along one or more lateral sides of the light guide plate; the plurality of light sources being arranged substantially along the first direction, light emission intensity of the plurality of light sources being individually controllable. The light emission intensity of light emitted from the backlight module and provided to the display panel is individually controllable in each segment of the array of the plurality of segments by individually applying the electric signal to each of the plurality of regions through the driving circuit and individually controlling light emission intensity of each of the plurality of light sources. FIG. 8 is a diagram illustrating the structure of a backlight module in some embodiments according to the present disclosure. Referring to FIG. 8, the backlight module in some embodiments includes a first electrode layer 4 having a plurality of first transparent electrodes 40 connected to a driving circuit 3. Each of the plurality of first transparent electrodes 40 is a rod-shape electrode extending substantially along a first direction, e.g., the column direction in FIG. 8. Each of the plurality of first transparent electrodes 40 defines one of the plurality of regions R. The backlight module in some embodiments further includes a plurality of light sources 7 along one or more lateral sides of the light guide plate; the plurality of light sources 7 being arranged substantially along the first direction. The light emission intensity of the plurality of light sources 7 is individually controllable. As shown in FIG. 8, light path of each of the plurality of light sources 7 is substantially along a second direction substantially perpendicular to the first direction. Each light path crosses over each of the plurality of first transparent electrodes 40, thereby defining one of the plurality of segments S. For example, each overlapping area between a projection of a light path and a projection of one of the plurality of first transparent electrodes 40 on the light transmittance control layer 2 corresponds to one of the plurality of segments S. Because light emission intensity of each of the plurality of light sources is individually controllable, and the electric signals applied to each of the plurality of regions R through the driving circuit 3 are individually controllable, the light emission intensity of light emitted from the backlight module and provided to the display panel can be individually controllable (e.g., programmable) in each of the array of the plurality of segments S.

Optionally, the backlight module includes a plurality of light sources along a single lateral side of the light guide plate. Optionally, the backlight module includes a plurality of light sources along two lateral sides of the light guide plate. Optionally, the plurality of light sources along two lateral sides of the light guide plate are arranged substantially along a same direction. Optionally, the plurality of light sources along two lateral sides of the light guide plate are arranged along two different directions. Optionally, the backlight module includes a plurality of light sources along three or more lateral sides of the light guide plate.

Figure 9:
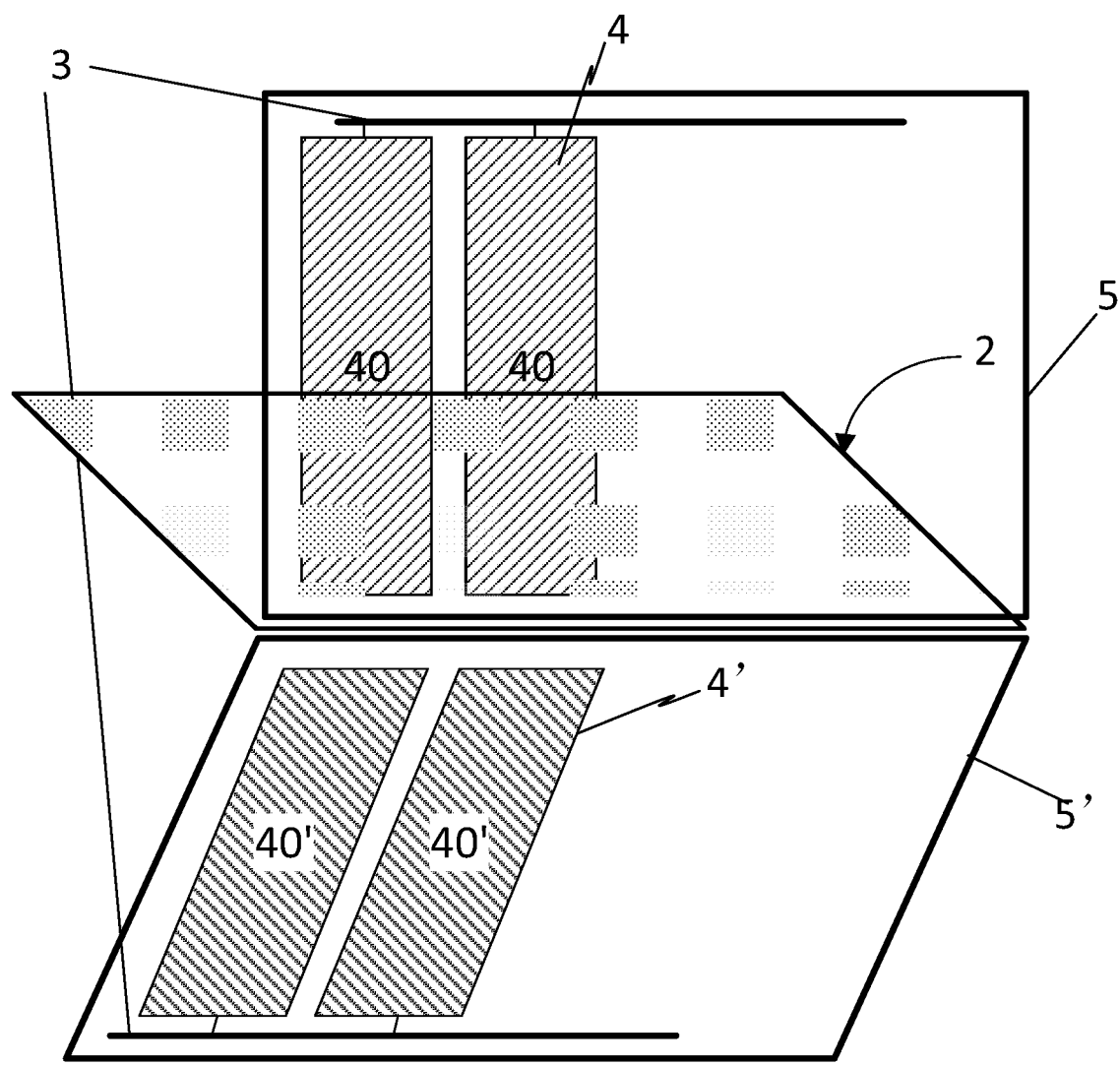
FIG. 9 is an exploded view of the structure of a backlight module in some embodiments according to the present disclosure.

FIG. 9 is an exploded view of the structure of a backlight module in some embodiments according to the present disclosure. Referring to FIG. 9, the backlight module in some embodiments includes a first base substrate 5, a first electrode layer 4 on the first base substrate 5, a light transmittance control layer 2 on a side of the first electrode layer 4 distal to the first base substrate 5, and a second electrode layer 4' on a side of the light transmittance control layer 2 distal to the first electrode layer 4. As shown in FIG. 9, the first electrode layer 4 includes a plurality of first transparent electrodes 40 of a rod shape, and the second electrode layer 4' includes a plurality of second transparent electrodes 40' of a rod shape, each of the plurality of second transparent electrodes 40' corresponding to one of the plurality of first transparent electrodes 40. The backlight module further includes a driving circuit 3 connected to the plurality of first transparent electrodes 40 and the plurality of second transparent electrodes 40'. The driving circuit 3 is configured to individually apply an electric signal (e.g., a voltage) to each pair of one of the first transparent electrodes 40 and one of the second transparent electrodes 40'. Each pair of one of the first transparent electrodes 40 and one of the second transparent electrodes 40' corresponds to (e.g., defines) one of the plurality of regions R (see, e.g., FIG. 8). By individually applying the electric signal to each pair of one of the first transparent electrodes 40 and one of the second transparent electrodes 40', and individually controlling light emission intensity of each of the plurality of light sources, the light transmittance in each of the plurality of regions can be individually controlled.

In some embodiments, the voltage individually applied to each pair of one of the first transparent electrodes 40 and one of the second transparent electrodes 40' can be adjusted between a first voltage level and a second voltage level. As a result, the light transmittance in each of the plurality of regions can be individually controlled between a first light transmittance level corresponding to the first voltage level and a second light transmittance level corresponding to the second voltage level. Moreover, the light emission intensity of each of the plurality of light sources can be adjusted between a first light source intensity level and a second light source intensity level. The light emission intensity of light emitted from the backlight module and provided to the display panel in each of the plurality of segments can be adjusted as a result of combining the effects of the light transmittance in each of the plurality of regions and the light emission intensity of each of the plurality of light sources. For example, the light emission intensity of light emitted from the backlight module and provided to the display panel can be adjusted between a first intensity level corresponding to a first combination of the first light transmittance level and the first light source intensity level and a second intensity level corresponding to a second combination of the second light transmittance level and the second light source intensity level. Optionally, the voltage individually applied to each pair of one of the first transparent electrodes 40 and one of the second transparent electrodes 40' can be time-sequentially programmed. Optionally, the light emission intensity of each of the plurality of light sources can also be time-sequentially programmed. Because the light emission intensity of light emitted from each of the plurality of segments may be individually controlled, a display effect having a high dynamic range can be achieved in a display apparatus having the present backlight module.

Figure 10:
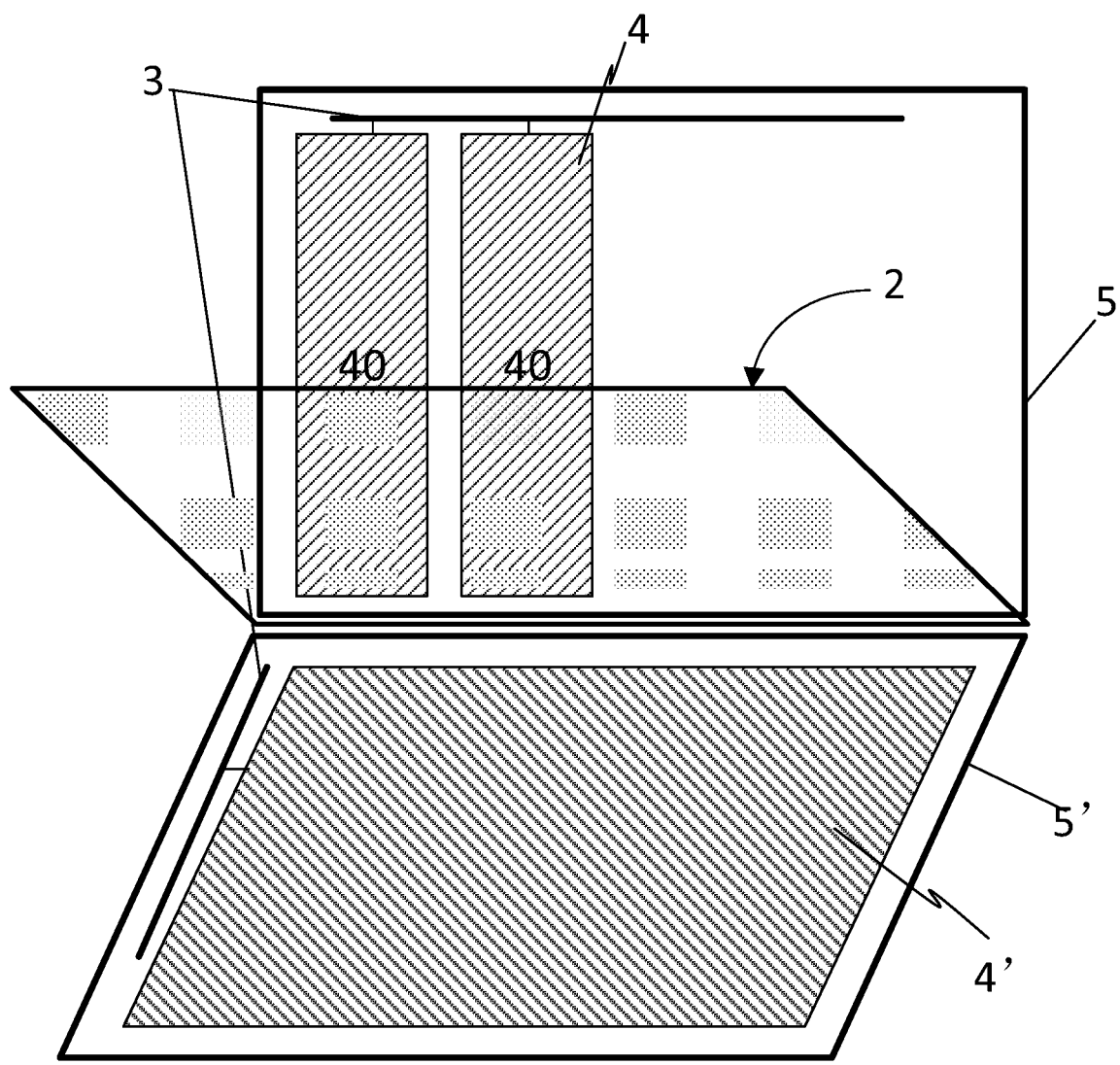
FIG. 10 is an exploded view of the structure of a backlight module in some embodiments according to the present disclosure.

FIG. 10 is an exploded view of the structure of a backlight module in some embodiments according to the present disclosure. Referring to FIG. 10, the backlight module in some embodiments includes a first base substrate 5, a first electrode layer 4 on the first base substrate 5, a light transmittance control layer 2 on a side of the first electrode layer 4 distal to the first base substrate 5, and a second electrode layer 4' on a side of the light transmittance control layer 2 distal to the first electrode layer 4. As shown in FIG. 10, the first electrotype layer 4 includes a plurality of first transparent electrodes 40 of a rod shape, and the second electrode layer 4' is an integral electrode layer configured to be provided with a common voltage. Optionally, a projection of the second electrode layer 4' on the light transmittance control layer 2 covers those of the plurality of first transparent electrodes 40. The backlight module further includes a driving circuit 3 connected to the plurality of first transparent electrodes 40 and the integral electrode layer of the second electrode layer 4'. The driving circuit 3 is configured to individually apply an electric signal (e.g., a voltage) to each of the plurality of first transparent electrodes 40. Each of the first transparent electrodes 40 corresponds to (e.g., defines) one of the plurality of regions R (see, e.g., FIG. 8). By individually applying the electric signal to each of the plurality of first transparent electrodes 40, light transmittance in each of the plurality of regions can be individually controlled.

In some embodiments, the voltage individually applied to each of the plurality of first transparent electrodes 40 can be adjusted between a first voltage level and a second voltage level. As a result, the light transmittance in each of the plurality of regions can be individually controlled between a first light transmittance level corresponding to the first voltage level and a second light transmittance level corresponding to the second voltage level. Moreover, the light emission intensity of each of the plurality of light sources can be adjusted between a first light source intensity level and a second light source intensity level. The light emission intensity of light emitted from the backlight module and provided to the display panel in each of the plurality of segments can be adjusted as a result of combining the effects of the light transmittance in each of the plurality of regions and the light emission intensity of each of the plurality of light sources. For example, the light emission intensity of light emitted from the backlight module and provided to the display panel can be adjusted between a first intensity level corresponding to a first combination of the first light transmittance level and the first light source intensity level and a second intensity level corresponding to a second combination of the second light transmittance level and the second light source intensity level. Optionally, the voltage individually applied to each of the plurality of first transparent electrodes 40 can be time-sequentially programmed. Optionally, the light emission intensity of each of the plurality of light sources can also be time-sequentially programmed. Because the light emission intensity of light emitted from each of the plurality of segments may be individually controlled, a display effect having a high dynamic range can be achieved in a display apparatus having the present backlight module.

Figure 11:
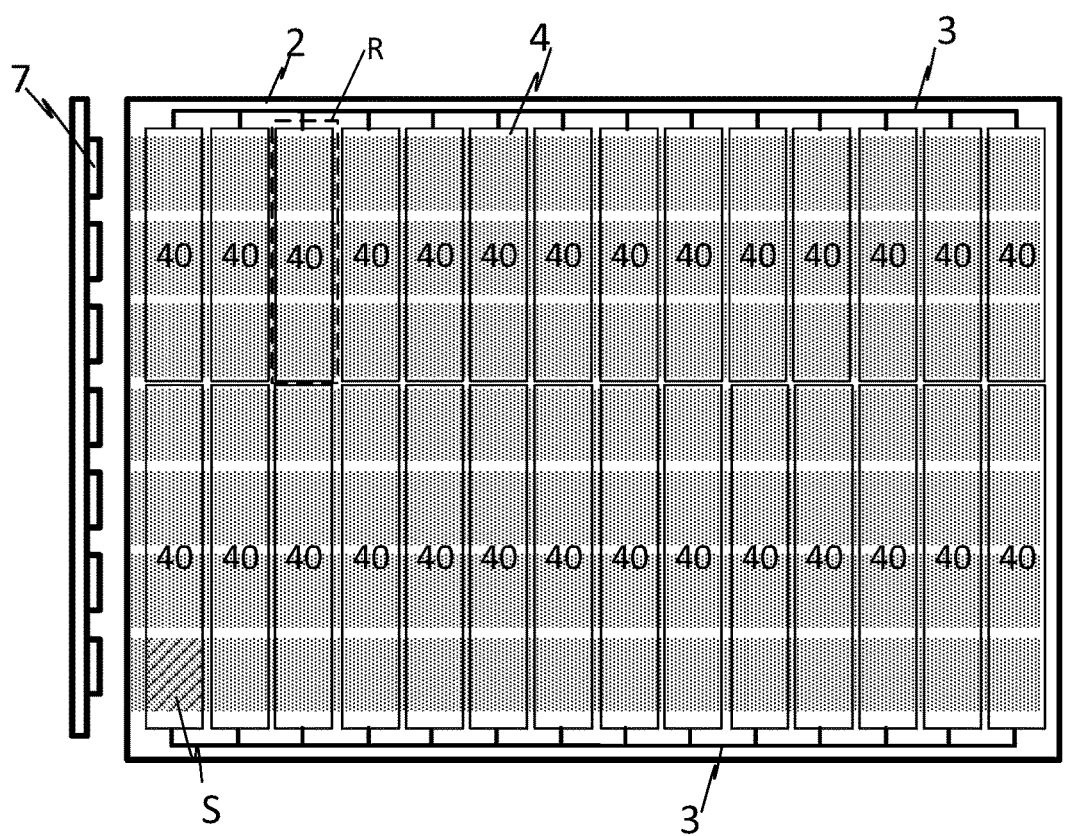
FIG. 11 is a diagram illustrating the structure of a backlight module in some embodiments according to the present disclosure.

FIG. 11 is a diagram illustrating the structure of a backlight module in some embodiments according to the present disclosure. Referring to FIG. 11, each of the plurality of regions R corresponds to some but not all segments in a row of the array of the plurality of segments S. For example, each of the plurality of regions R in the top half of the light transmittance control layer 2 corresponds to three of the plurality of segments S, and each of the plurality of regions R in the bottom half of the light transmittance control layer 2 corresponds to four of the plurality of segments S.

In some embodiments, the light transmittance control layer includes liquid crystal molecules, light transmittance in the plurality of regions of light transmittance control layer being individually controllable by changing an orientation of the liquid crystal molecules in each of the plurality of regions. Optionally, the light transmittance control layer includes a polymer dispersed liquid crystal layer having polymer dispersed liquid crystal. Optionally, the polymer dispersed liquid crystal layer is made by scattering liquid crystal particles of several micrometers into a polymer. Optionally, the polymer dispersed liquid crystal layer is made by dispersing liquid crystal molecules into a polymer network. Absent of an external electric signal, the liquid crystal molecules in the polymer dispersed liquid crystal layer are randomly aligned, rendering the polymer dispersed liquid crystal layer non-transmissive. When an electric signal (e.g., a voltage) is applied to the polymer dispersed liquid crystal layer in one of the plurality of regions, liquid crystal molecules in the polymer dispersed liquid crystal layer in the one of the plurality of regions are aligned along a substantially the same direction, rendering the polymer dispersed liquid crystal layer light transmissive.

In some embodiments, the light transmittance control layer includes a liquid crystal molecule layer. Optionally, the light transmittance control layer, the first electrode layer, and the second electrode layer constitute a twisted nematic liquid crystal display module. Absent of an external electric signal (Off-state), the twisted nematic liquid crystal display module is light transmissive. When an electric signal (e.g., a voltage) is applied to the polymer dispersed liquid crystal layer (ON-state) in one of the plurality of regions, the twisted nematic liquid crystal display module in the one of the plurality of regions becomes light non-transmissive.

In some embodiments, the light transmittance control layer includes an electrochromic material layer. Absent of an external electric signal, the electrochromic material layer has a first light blocking degree, e.g., being substantially light transmissive. When an electric signal (e.g., a voltage) is applied to the electrochromic material layer in one of the plurality of regions, the electrochromic material layer in the one of the plurality of regions has a second light blocking degree that is higher than the first light blocking degree.

In some embodiments, the light transmittance control layer includes a smart glass. Absent of an external electric signal, the smart glass has a first light blocking degree, e.g., being substantially light transmissive. When an electric signal (e.g., a voltage) is applied to the smart glass in one of the plurality of regions, the smart glass in the one of the plurality of regions has a second light blocking degree that is higher than the first light blocking degree.

Optionally, the backlight module is an edge-lit backlight module. Optionally, a thickness of the present backlight module is no greater than 25 mm, e.g., no greater than 10 mm, or no greater than 5 mm. Optionally, a total thickness of the black light module is no more than 5 mm.

In another aspect, the present disclosure provides a display apparatus having a backlight module described herein. Optionally, the display apparatus is a high dynamic range rendering display apparatus. Optionally, the display apparatus is a liquid crystal display apparatus. Examples of appropriate display apparatuses include, but are not limited to, an electronic paper, a mobile phone, a tablet computer, a television, a monitor, a notebook computer, a digital album, a GPS, etc.

In another aspect, the present disclosure provides a method of driving a backlight module having a light guide plate and a light transmittance control layer. In some embodiments, the method includes individually controlling light emission intensity of light emitted from the backlight module in each segment of an array of a plurality of segments in the backlight module. Optionally, the backlight module is an edge-lit backlight module. In some embodiments, the backlight module is used in a display apparatus. The individual control of the light emission intensity of light emitted from the backlight module can be based on the image display data to be displayed on the display apparatus. For example, the light emission intensity of light emitted from each segment of an array of a plurality of segments in the backlight module can be calculated based on the image display data. Based on the result of the calculation, the light transmittance in each region of the plurality of regions can be determined, and optionally, the light emission intensity of each of the plurality of light sources can be determined to achieve the desired display effects. The driving circuit transmits the electric signals respectively to each of the plurality of regions, e.g., each of the plurality of first transparent electrodes, to individually control the light transmittance in each of the plurality of regions. Optionally, the driving circuit further transmits electric signals respectively to each of the plurality of light sources, to individually control the light emission intensity of each of the plurality of light sources.

In some embodiments, each of the plurality of regions corresponds to one or more of the plurality of segments. Optionally, the step of individually controlling light emission intensity of light emitted from the backlight module in each segment includes individually controlling light transmittance in each region of a plurality of regions of the light transmittance control layer. Optionally, the step of individually controlling light transmittance in each region of a plurality of regions of the light transmittance control layer includes individually applying an electric signal to each of the plurality of regions.

In some embodiments, the light transmittance control layer includes liquid crystal molecules. Optionally, the step of individually controlling light transmittance in each region of a plurality of regions of the light transmittance control layer includes changing an orientation of the liquid crystal molecules in each of the plurality of regions individually.

In some embodiments, each of the plurality of regions corresponds to a single one of the plurality of segments. Optionally, the step of individually controlling light emission intensity of light emitted from the backlight module in each segment includes individually applying the electric signal to each of the plurality of regions, thereby controlling light emission intensity of light emitted from each segment. Optionally, the step of individually applying the electric signal to each of the plurality of regions includes time-sequentially applying a plurality of voltages to the plurality of regions one row after another.

In some embodiments, each of the plurality of regions corresponds to a plurality of segments in a row of the array of the plurality of segments along a first direction. Optionally, the backlight module further includes a plurality of light sources along one or more lateral sides of the light guide plate; the plurality of light sources being arranged substantially along the first direction. Optionally, the step of individually controlling light emission intensity of light emitted from the backlight module in each segment includes individually applying the electric signal to each of the plurality of regions; and individually controlling light emission intensity of each of the plurality of light sources. Optionally, the step of individually controlling the voltage applied to each of the plurality of regions includes time-sequentially applying a plurality of voltages respectively to the plurality of regions.

In some embodiments, the method further includes, in each frame of image, receiving a plurality of data signals; and calculating a calculated light emission intensity of light for each segment based on the plurality of data signals in each frame of image. Optionally, the step of individually controlling light emission intensity of light emitted from the backlight module in each segment is based on the calculated light emission intensity of light for each segment.

In another aspect, the present disclosure provides a method of displaying high dynamic range images in a display apparatus having the present backlight module, the backlight module including a light guide plate and a light transmittance control layer and having an array of a plurality of segments, light emission intensity of light emitted from which is individually controllable. In some embodiments, the method includes, in each frame of image, generating a plurality of data signals corresponding to a plurality of subpixels in the display apparatus; calculating a calculated light emission intensity of light for each segment of an array of a plurality of segments in the backlight module based on the plurality of data signals in each frame of image; and individually controlling light emission intensity of light emitted from the backlight module in each segment of the plurality of segments in the backlight module. Optionally, the step of individually controlling light emission intensity of light emitted from the backlight module in each segment is performed according to the steps described above in the context of the method of driving the backlight module. Optionally, the backlight module is an edge-lit backlight module.

In another aspect, the present disclosure provides a driving circuit for driving a backlight module including a light guide plate and a light transmittance control layer and having an array of a plurality of segments, light emission intensity of light emitted from which is individually controllable. In some embodiments, the driving circuit is configured to, in each frame of image, receive a plurality of data signals; calculate a calculated light emission intensity of light for each segment based on the plurality of data signals in each frame of image; and individually control light emission intensity of light emitted from the backlight module in each segment based on the calculated light emission intensity of light for each segment. Optionally, the light transmittance control layer includes a light transmittance control material having a variable light transmissivity, light transmittance in a plurality of regions of the light transmittance control layer being individually controllable by the driving circuit. Optionally, the driving circuit is configured to individually control light transmittance in each of the plurality of regions. Optionally, the driving circuit is configured to individually applying an electric signal to each of the plurality of regions. Optionally, the backlight module further includes a plurality of light sources along one or more lateral sides of the light guide plate; light emission intensity of the plurality of light sources being individually controllable by the driving circuit. Optionally, the driving circuit is configured to individually control light emission intensity of each of the plurality of light sources.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method of driving an edge-lit backlight module comprising a light guide plate and a light transmittance control layer, comprising:
    individually controlling light emission intensity of light emitted from the edge-lit backlight module in each segment of an array of a plurality of segments in the edge-lit backlight module by individually applying an electric signal to each region of a plurality of regions of the light transmittance control layer, each of the plurality of regions corresponding to one or more of the plurality of segments;
    receiving a plurality of data signals in each frame of image; and
    calculating a calculated light emission intensity of light for each segment based on the plurality of data signals in each frame of image;
    wherein individually controlling light emission intensity of light emitted from the edge-lit backlight module in each segment is based on the calculated light emission intensity of light for each segment.

2. The method of claim 1, wherein each of the plurality of regions corresponds to a single one of the plurality of segments; and
    individually applying the electric signal to each region of the plurality of regions comprises time-sequentially applying a plurality of electric signals to the plurality of regions one row after another.

3. The method of claim 1, wherein each of the plurality of regions corresponds to a plurality of segments in a row of the array of the plurality of segments along a first direction;
    the edge-lit backlight module further comprises a plurality of light sources along one or more lateral sides of the light guide plate; the plurality of light sources being arranged substantially along the first direction;
    individually controlling light emission intensity of light emitted from the edge-lit backlight module in each segment further comprises individually controlling light emission intensity of each of the plurality of light sources;
    wherein individually applying the electric signal to each region of the plurality of regions comprises time-sequentially applying a plurality of electric signals respectively to the plurality of regions.

4. A method of displaying high dynamic range images in a display apparatus having an edge-lit backlight module including a light guide plate and a light transmittance control layer and having an array of a plurality of segments, light emission intensity of light emitted from each segment of the plurality of segments is individually controllable, the method comprising, in each frame of image:
    generating a plurality of data signals corresponding to a plurality of subpixels in the display apparatus;
    calculating a calculated light emission intensity of light for each segment of the plurality of segments based on the plurality of data signals in each frame of image; and
    individually controlling light emission intensity of light emitted from the edge-lit backlight module in each segment of the plurality of segments in the edge-lit backlight module by individually applying an electric signal to each region of a plurality of regions of the light transmittance control layer, each of the plurality of regions corresponding to one or more of the plurality of segments.

5. The method of claim 4, wherein each of the plurality of regions corresponds to a single one of the plurality of segments; and
    individually applying the electric signal to each region of the plurality of regions comprises time-sequentially applying a plurality of electric signals to the plurality of regions one row after another.

6. The method of claim 4, wherein each of the plurality of regions corresponds to a plurality of segments in a row of the array of the plurality of segments along a first direction;
    the edge-lit backlight module further comprises a plurality of light sources along one or more lateral sides of the light guide plate; at least one of the plurality of light sources being arranged substantially along the first direction;
    individually controlling light emission intensity of light emitted from the edge-lit backlight module in each segment further comprises individually controlling light emission intensity of each of the plurality of light sources;
    wherein individually applying the electric signal to each region of the plurality of regions comprises time-sequentially applying a plurality of electric signals respectively to the plurality of regions.

* * * * *